United States Patent [19]
Hill et al.

[11] Patent Number: 5,808,615
[45] Date of Patent: Sep. 15, 1998

[54] PROCESS AND SYSTEM FOR MAPPING THE RELATIONSHIP OF THE CONTENT OF A COLLECTION OF DOCUMENTS

[75] Inventors: Joe R. Hill, Austin; Gregory J. Thompson, Round Rock, both of Tex.

[73] Assignee: Electronic Data Systems Corporation, Plano, Tex.

[21] Appl. No.: 640,604

[22] Filed: May 1, 1996

[51] Int. Cl.$^6$ .................................................. G06F 3/00
[52] U.S. Cl. ............................................ 345/356; 345/440
[58] Field of Search ................................... 395/356, 603, 395/140, 968; 345/356, 357, 603, 613, 968, 969, 774, 776, 440; 707/102, 513, 514

[56] References Cited

U.S. PATENT DOCUMENTS

| | | | |
|---|---|---|---|
| 4,823,306 | 4/1989 | Barbic et al. | 707/5 |
| 5,321,833 | 6/1994 | Chang et al. | 707/5 |
| 5,418,948 | 5/1995 | Turtle | 707/4 |
| 5,515,488 | 5/1996 | Hoppe et al. | 345/440 |
| 5,537,586 | 7/1996 | Amram et al. | 707/3 |
| 5,594,897 | 1/1997 | Goffman | 707/102 |

OTHER PUBLICATIONS

Xin, Lu, "Document retrieval. A structural approach." Inf. Process Manage, V. 26, No. 2, 1990, pp. 209–218.

"An Algorithm for Drawing General Undirected Graphs", Tomihisa Kamada and Satoru Kawai, Department of Information Science, Faculty of Science, University of Tokyo dated Apr. 12, 1989.

Primary Examiner—A. Katbab
Attorney, Agent, or Firm—Anthony E. Peterman; L. Joy Griebenow

[57] ABSTRACT

A process is provided for mapping the relationship of the content of a collection of documents (14). The process includes providing a collection (12) of documents (14) where each document (14) includes text. Relevance measures are determined that represent a relevance between each pair of documents (14) based upon the text of the documents (14). A graph (22) is then generated that has nodes (30) and edges (32) with each edge (32) connecting two nodes (30). The graph (22) has a node (30) associated with each document (14) and has an edge (32) connecting nodes (30) for which the relevance measure between associated documents (14) is greater than a specified threshold. In this manner, the graph (22) maps the relationship of the content of the collection (12) of documents (14).

20 Claims, 4 Drawing Sheets

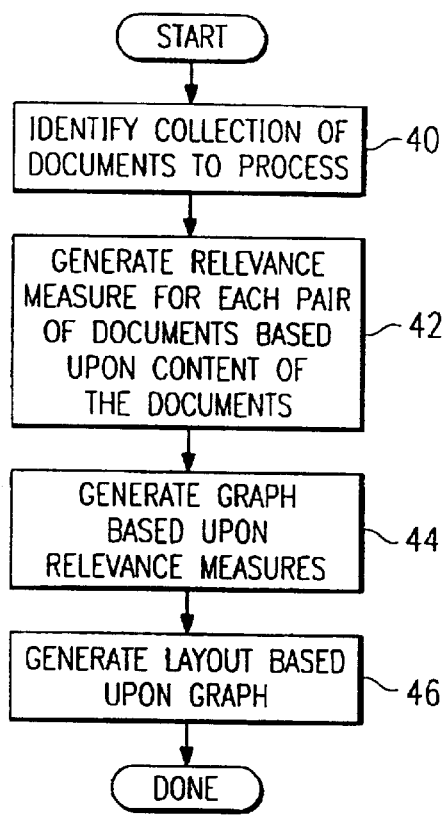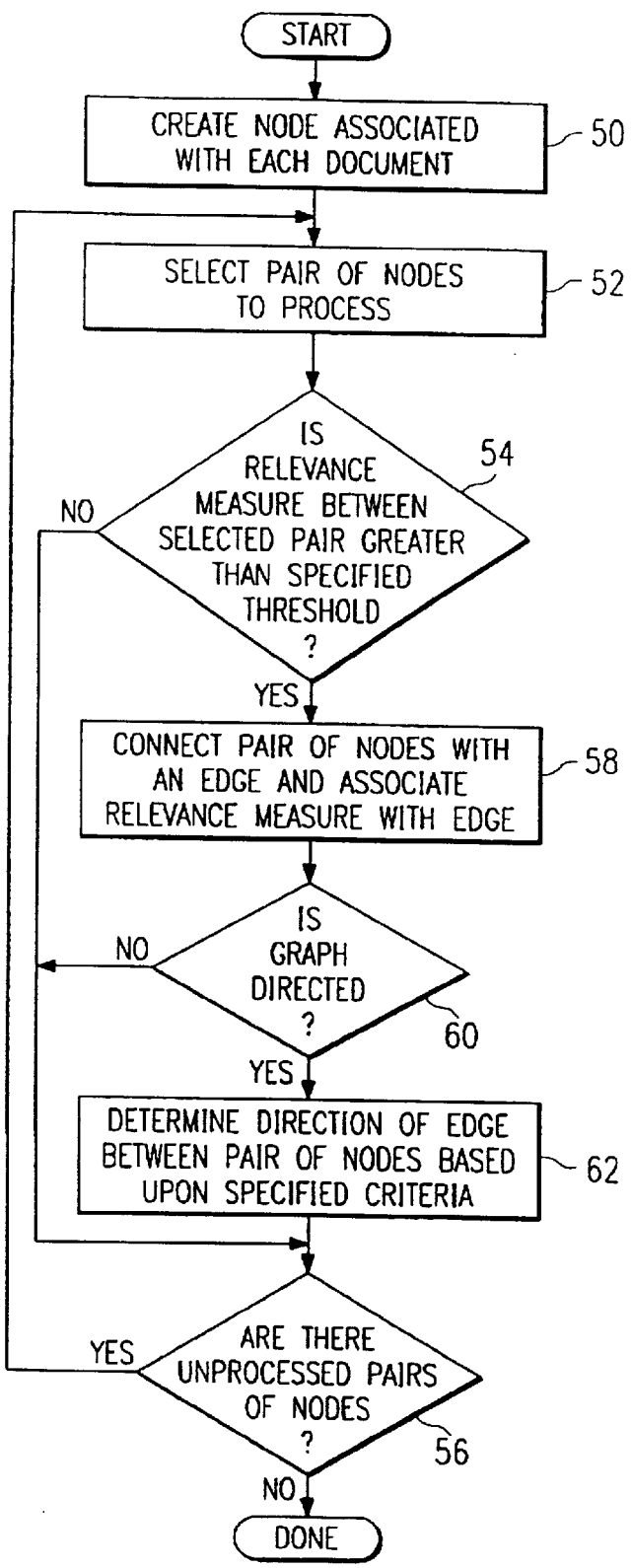

PROCESS AND SYSTEM FOR MAPPING THE RELATIONSHIP OF THE CONTENT OF A COLLECTION OF DOCUMENTS

TECHNICAL FIELD OF THE INVENTION

This invention relates in general to the field of electronic systems, and more particularly to a process and system for mapping the relationship of the content of a collection of documents.

BACKGROUND OF THE INVENTION

Conventional methods for mapping document interrelationships are based upon citations made by the authors. One method based upon citations is a science citation index which is described, for example, in "Citation Indexing—Its Theory and Application in Science, Technology, and Humanities" by Eugene Garfield, New York, John Wiley & Sons, Inc., 1979. There is also a conventional legal citation analysis that can be used to map decisions or opinions directly referred to by later decisions or opinions (e.g., Shephards' citations). Another conventional method uses the patent citations that appear on patents and that are included within patent databases to map relationships between the patents. These conventional methods provide a way to map documents based upon citation analysis. Some of these methods include producing graphical layouts representing results of the citation analysis.

These conventional methods use citations as a substitute for the actual content or text of the documents and suffer from this reliance upon citations. If an author does not provide a citation to a related document, no relationship is recognized between the two documents. The result is that the relationships generated by citation analysis are only as good as the respective author's knowledge of related documents and effort to provide accurate citations thereto.

SUMMARY OF THE INVENTION

In accordance with the present invention, a process and system for mapping an intellectual territory of a collection of documents is provided that substantially eliminates or reduces disadvantages and problems associated with previously developed methods for interrelating documents.

According to one embodiment of the present invention, a process is provided for mapping the relationship of the content of a collection of documents. The process includes providing a collection of documents where each document includes text describing a content of the document. Relevance measures are determined that represent a relevance between each pair of documents based upon the text of the documents. A graph is then generated that has nodes and edges with each edge connecting two nodes. The graph has a node associated with each document and has an edge connecting nodes for which the relevance measure between associated documents is greater than a specified threshold. In this manner, the graph maps the relationship of the content of the collection of documents.

According to another embodiment of the present invention, a system for mapping the relationship of the content (or the intellectual territory) of a collection of documents is provided. The system includes the collection of documents where each document including text describing a content of the document. The system also includes a relevance generator connected to access the collection of documents. The relevance generator is operable to generate relevance measures representing a relevance between each pair of documents based upon the text of the documents. A graph generator is connected to access the relevance measures. The graph generator is operable to generate a graph having nodes and edges where each edge connects two nodes. The graph has a node associated with each document and has an edge connecting nodes for which the relevance measure between associated documents is greater than a specified threshold. The system further includes a layout generator connected to access the graph. The layout generator is operable to generate a layout based upon the graph to provide a display of a graphical relationship between the documents.

A technical advantage of the present invention is the use of a relevance measure to interrelate documents in a graph such that the graph maps the intellectual content of the documents.

Another technical advantage of the present invention is the ability to process a collection of documents that may or may not have direct references or citations to one another and map the content of the documents based upon the relevance between the content of the documents.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 3 is a flow chart of one embodiment of a process for mapping an intellectual territory of a collection of documents according to the teachings of the present invention;

FIG. 4 is a flow chart of one embodiment of generating a graph based upon relevance measures according to the teachings of the present invention;

DETAILED DESCRIPTION OF THE INVENTION

Figure 1:
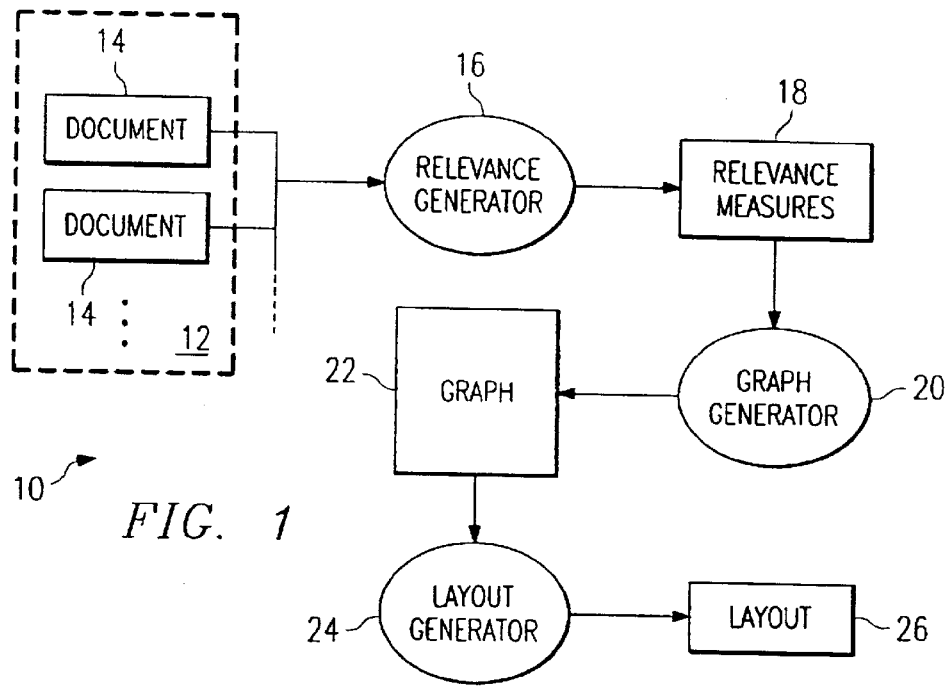
FIG. 1 is a block diagram of one embodiment of a system for mapping an intellectual territory of a collection of documents constructed according to the teachings of the present invention.

FIG. 1 is a block diagram of a system, indicated generally at 10, for mapping an intellectual territory of a collection of documents. System 10 includes a repository 12 containing a collection of documents 14. Each document 14 includes text information that describes content of the document. A relevance generator 16 is coupled to repository 12 and accesses documents 14. Relevance generator 16 produces relevance measures 18 which represent the relevance between each pair of documents 14. The relevance measures 18 are based upon the text information of each pair of documents 14 which can include any portion of the text of the document 14, including key words within the document 14.

Graph generator 20 accesses relevance measures 18. Graph generator 20 produces a graph 22 which provides an interrelationship between documents 14 that maps the intellectual territory of documents 14. A layout generator 24 receives graph 22 and produces a layout 26. Layout 26 provides a graphical representation of the relationship between documents 14 and is based upon graph 22.

In operation, relevance generator 16 compares the content of each pair of documents 14 and produces a relevance measure representing the relevance between the content of the pair of documents 14. This comparison can be based upon the text of documents 14 and to that extent represents the relevance between the content described by the text of documents 14. In one embodiment of the present invention, relevance generator 16 operates according to the log likelihood ratio process and system described in U.S. patent application Ser. No. 08/523,233, now U.S. Pat. No. 5,713,016, entitled "Process and System for Determining Relevance Between Two Documents" and assigned to Electronic Data Systems Corporation, the disclosure of which is incorporated herein by reference.

Relevance measures 18 generated by relevance generator 16 provide a value for each pair of documents 14 where the value represents how relevant the pair of documents are with respect to one another. For example, a large relevance measure can represent the fact that two documents 14 are very similar in content, while a low relevance measure can represent the fact that two documents 14 are not similar in content. It should be understood that the opposite could be true (i.e., a large relevance measure indicating that two documents are not similar in content). Relevance measures 18 can be set forth in a table as shown below.

| Table 1 | Document A | Document B | Document C | ... |
|---|---|---|---|---|
| Document A | — | $R_{AB}$ | $R_{AC}$ | ... |
| Document B | $R_{AB}$ | — | $R_{BC}$ | ... |
| Document C | $R_{AC}$ | $R_{BC}$ | — | ... |
| ... | ... | ... | ... | — |

According to the present invention, graph generator 20 uses relevance measures 18 to generate graph 22. Graph 22 includes a node associated with each document and edges connecting the nodes. A user can specify a threshold that is appropriate for the application. Graph generator 20 uses the specified threshold to determine whether to connect or not to connect nodes in graph 22 with an edge. For example, the threshold could be set at some value such that nodes are connected with an edge only if the relevance measure between the associated documents is above the threshold. Thus, graph generator 20 generates graph 22 by creating a node for each document 14. Then the nodes are connected by an edge whenever a pair of nodes are associated with documents having a relevance measure 18 above the specified threshold. Graph generator 20 thereby associates each edge in graph 22 with the appropriate relevance measure 18.

Graph 22 provides a mapping of the intellectual territory of the collection of documents 14 by representing relationships between relevant documents based upon the content of those documents. In general, graph 22 provides a mapping for a large number of documents for which manual analysis would not be feasible. For purposes of explanation, one embodiment of a simplified graph 22 is shown and described in more detail later with respect to FIG. 2.

Layout generator 24 operates to process graph 22 and produce layout 26 which provides a graphical representation of the relationship between documents 14 based upon graph 22. Layout generator 24 uses the relationships between documents 14 represented by graph 22 as well as the relevance measures 18 associated with each edge in graph 22. Layout generator 24 can also use additional information about documents 14 such as the date the documents were created, if desired. Layout 26 shows a relationship between documents 14 and can show additional information such as the relevance between pairs of documents 14, key words in documents 14, and key words contributing to the relevance between documents 14. Several embodiments of layout 26 are shown and described in more detail with respect to FIGS. 5B and 5C and FIG. 6.

Figure 2:
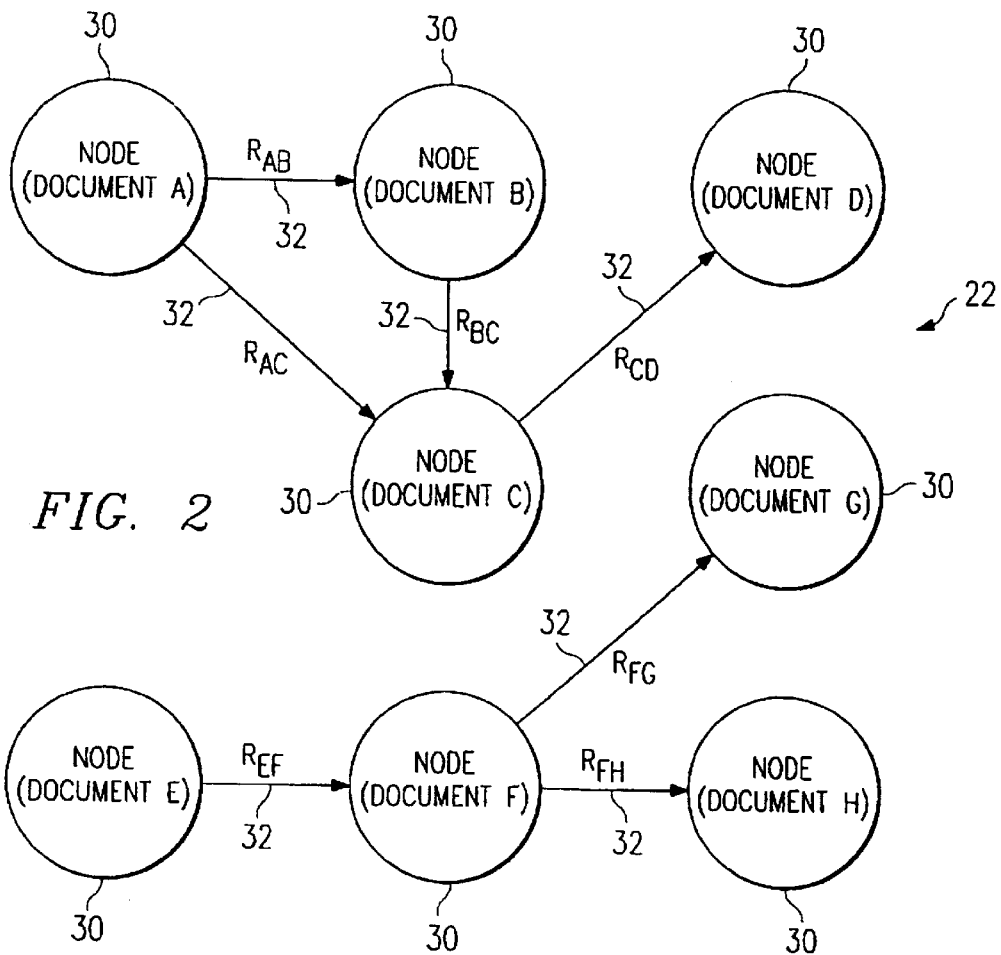
FIG. 2 is a diagram of one embodiment of a simplified graph interrelating documents constructed according to the teachings of the present invention.

FIG. 2 is a diagram of one embodiment of a simplified graph 22 constructed according to the teachings of the present invention. Graph 22 includes a plurality of nodes 30 and a plurality of edges 32, as shown. Each node 30 is associated with one of documents 14. In the simplified embodiment of FIG. 2, eight documents, A–H, are mapped by graph 22. Each edge 32 connects nodes 30 that are associated with documents for which the relevance measure between the documents is above a specified threshold. Where the relevance between two documents is below the specified threshold, there is no edge 32 drawn between nodes 30. For example, edge 32 connecting the node associated with Document A and the node associated with Document B is associated with the relevance measure $R_{AB}$ which relevance measure is above the specified threshold. As shown, the remaining edges 32 are associated with the respective relevance measures. In this manner, graph 22 of FIG. 2 provides a mapping of the intellectual territory of the collection of documents A–H.

Graph 22 can be a directed graph or an undirected graph. In a directed graph, like that shown in FIG. 2, each edge 32 connecting a pair of nodes 30 also orders nodes 30 as shown by the arrowheads. In an undirected graph, each edge 32 only connects nodes 30 and does not provide an ordering of nodes 30. The ordering of nodes 30, if present in graph 22, is generated based upon information other than the relevance measures, such as the date documents 14 were created.

FIG. 3 is a flow chart of one embodiment of a process for mapping an intellectual territory of a collection of documents according to the teachings of the present invention. In step 40, the system identifies a collection of documents to be processed. This step of identifying documents can include identifying a subset or subclass of documents from a larger collection of documents. For example, a repository holding a large number of documents can be analyzed to identify clusters in which documents are somewhat related. Each cluster can then form the collection of documents identified in step 40 to be processed.

In step 42, the system generates a relevance measure defining the relevance between each pair of documents based upon the content of the documents. This generation of relevance measures can be based upon the log likelihood ratios system and process defined in U.S. patent application Ser. No. 08/523,233. Step 42 can include analyzing the texts of each pair of documents and comparing those texts to generate a relevance measure representing the relevance between the content of each pair of documents.

In step 44, the system generates a graph based upon the relevance measures generated in step 42. The graph generated in step 44 can be like that illustrated and described in more detail with respect to FIG. 2. One embodiment of a process for generating a graph is shown and described in more detail with respect to FIG. 4.

In step 46, the system generates a layout based upon the graph generated in step 44. This layout provides a graphical representation of the information provided by the graph. In step 46, the layout generated can be a gravity layout, a minimum-energy layout, a time-based layout, or other appropriate layout. Embodiments of such layouts are shown and described in more detail with respect to FIGS. 5B and 5C and FIG. 6.

FIG. 4 is a flow chart of one embodiment of generating a graph based upon relevance measures of step 44 of FIG. 3. In step 50, the system creates a node associated with each document in the document repository. Then, in step 52, the system selects a pair of nodes to process.

In step 54, the system checks whether the relevance measure for the selected pair of documents is greater than a specified threshold. If not, the system checks, in step 56, whether there are unprocessed pairs of nodes. If there are unprocessed pairs of nodes, the system returns to step 52. If there are no unprocessed pairs of nodes, the graph generation process has completed.

If, in step 54, the relevance measure for the selected pair of documents is greater than the specified threshold, the system connects the pair of nodes with an edge in step 58. Also in step 58, the system associates the relevance measure with the edge connecting the nodes. This provides a representation that the documents are relevant and the measure of that relevance.

In step 60, the system checks whether the graph is a directed graph. If not, the system advances to step 56 to check whether there are unprocessed pairs of nodes. If the graph is a directed graph, the system determines, in step 62, the direction of the edge between the pair of nodes based upon a predetermined specified criteria. In one embodiment of the present invention, the specified criteria is the date upon which each document was created. In general, as mentioned above, a directed graph is one in which the nodes are connected in a specified order as opposed to an undirected graph in which the nodes are connected but unordered. After determining the direction of the edge between the pair of nodes in step 62, the system advances to step 56 to check whether there are unprocessed pairs of nodes.

Figure 5A:
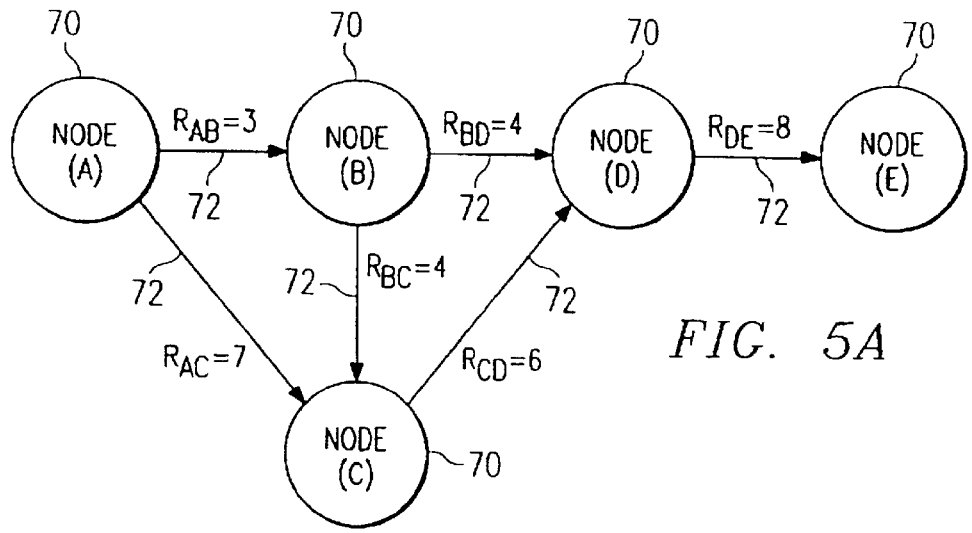
FIGS. 5A, 5B, and 5C show one embodiment of a simplified graph and embodiments of a simplified time-based layout and minimum-energy layout generated based upon that graph according to the teachings of the present invention.
Figure 5B:
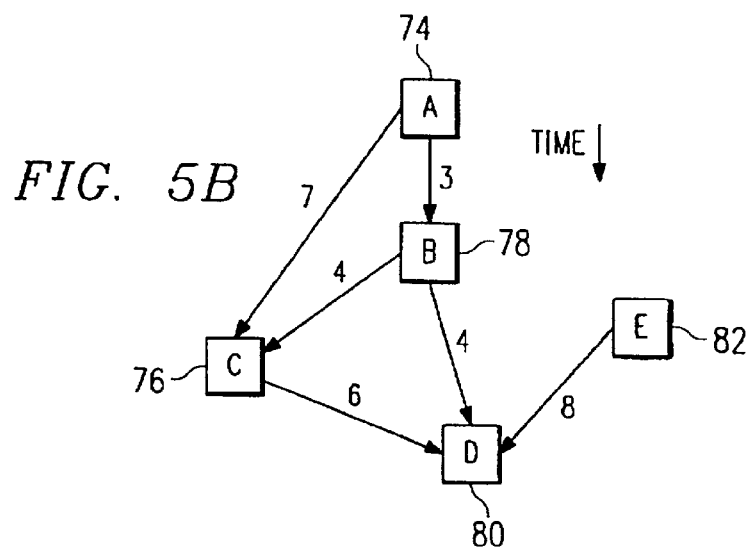
Figure 5C:
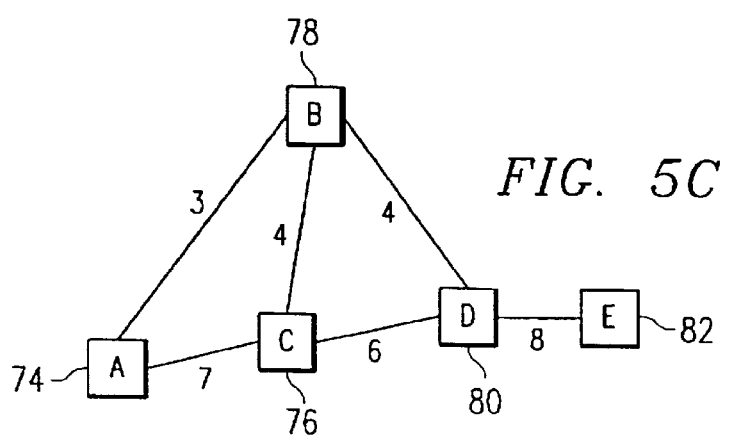

FIGS. 5A, 5B, and 5C show one embodiment of a simplified graph and embodiments of a simplified time-based layout and a simplified minimum-energy layout generated based upon that graph according to the teachings of the present invention. FIG. 5A is a diagram of a simplified graph showing nodes 70 and edges 72. The graph interrelates five documents, A–E, having the relevance measures shown. In this example, the threshold used to generate the graph was a relevance measure having a value of 2.

FIG. 5B shows a simplified time-based layout generated based upon the graph of FIG. 5A. The layout of FIG. 5B represents a document 74 connected to a document 76 and to a document 78. Document 76 and document 78 are connected to a document 80. Document 80 is, in turn, connected to document 82. The relevance measures between each pair of documents are specified next to the edge-connecting the associated documents. In FIG. 5B, the documents are interrelated based upon the time of creation, and time is represented as running down the layout with respect to connected documents. Thus, document A was created before document B, and documents C and E were created before document D. As can be seen from FIG. 5B, the relevance measures between the pairs of documents do not dictate the spatial relationship between the documents, but only dictate the connections between the documents. In general, the time-based layout of FIG. 5B displays a parent-child-grandchild type relationship between the documents.

FIG. 5C shows a simplified minimum-energy layout generated based upon the graph of FIG. 5A. One method for creating a minimum-energy layout is disclosed and described in "An algorithm for Drawing General Undirected Graphs" by Tomihisa Kamada and Satoru Kawai published in Information Processing Letters 31 (1989) at pages 7–15.

The minimum-energy layout of FIG. 5C is based upon the relevance measures between documents connected by an edge in the graph of FIG. 5A. The minimum-energy layout attempts to correlate the spatial distance between documents with the number of edges between the documents as weighted according to the relevance of each pair of documents. The layout then displays the positioning of the documents that provide the lowest energy based upon matching spatial distance to logical distance. This minimum-energy layout provides a representation of the relationship between the content of the documents. For example, it can be seen that documents A and C are more closely related, documents D and E are more closely related, and document B is somewhat unrelated to the other four documents.

With a minimum-energy layout, the process evaluates the weight along the edges of the graph. The layout process keeps positioning documents until a minimal energy is achieved. In general, the process counts how far away two nodes are from one another by how many edges there are in the shortest path between the two and associates a weight with each edge according to the associated relevance measure. The sum of the weighted length for the shortest path between nodes determines the distance between the associated documents in the layout. The goal of the minimum-energy process is to place each of the documents so that the actual physical distance lines up with that logical distance.

Another type of layout is a gravity layout (not shown). A gravity layout arranges documents in a spatial relationship based upon the relevance measures between all of the documents. This arrangement is generated according to a gravity method that takes account of the relevance measure between each pair of documents regardless of whether there is an edge between the documents. The resulting layout positions documents having a higher relevance closer to one another and documents having a lower relevance further apart from one another. In this manner, a gravity layout provides a visual display of the content relationship of the documents.

Layouts can also include information in addition to the positioning of documents and edges. A layout can also display information such as the value for the relevance measure between documents, a list of key words for each document, a list of key words contributing to the relevance between documents, or the entities having ownership of certain documents (e.g., where the documents are patents). By showing such additional information, a layout can provide more information about the relationship of the content of the documents (i.e., the intellectual territory covered by the documents).

Figure 6:
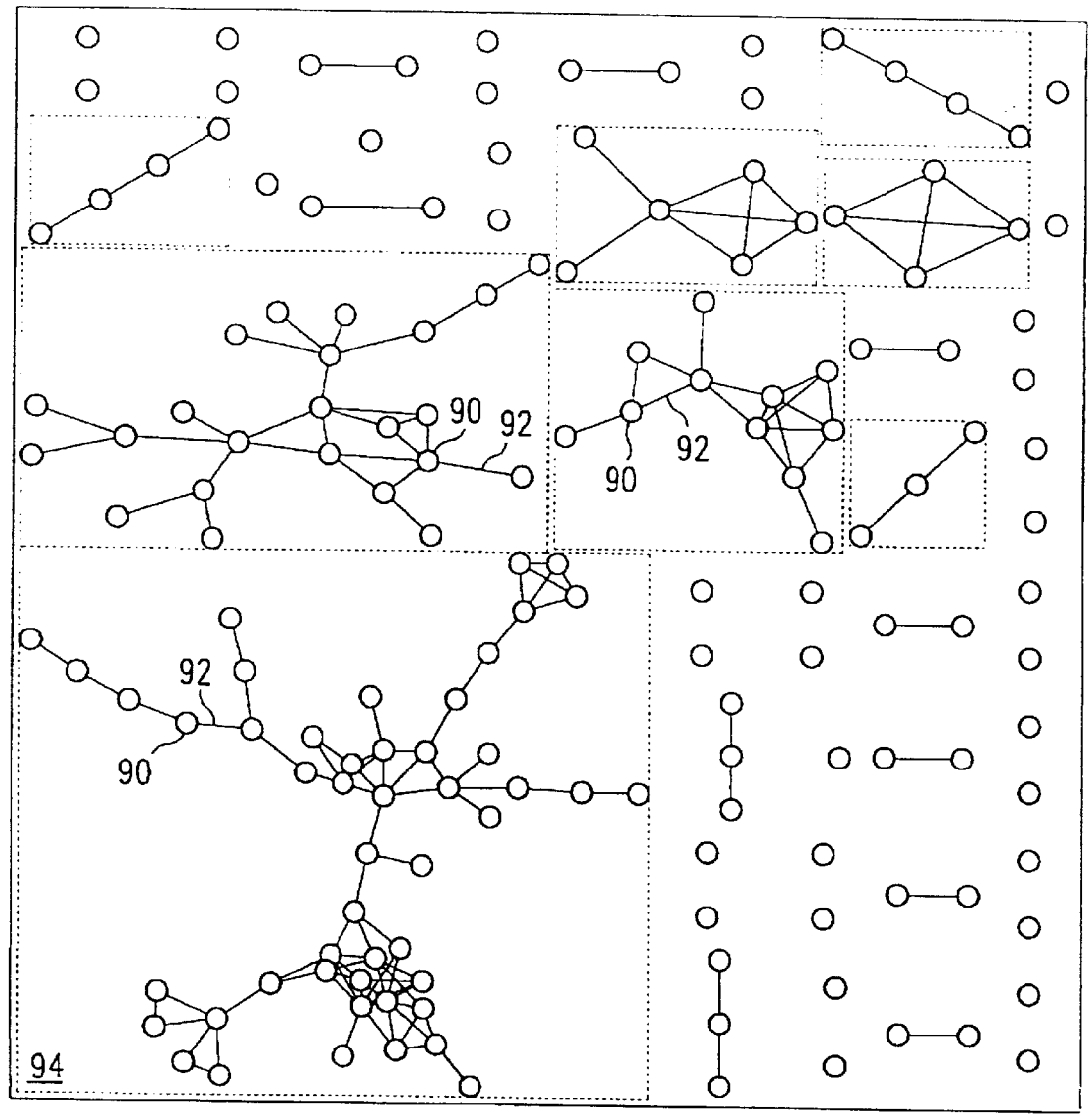
FIG. 6 shows one embodiment of a more complex minimum-energy layout according to the teachings of the present invention.

FIG. 6 shows one embodiment of a more complex minimum-energy layout according to the teachings of the present invention. The layout of FIG. 6 represents a plurality of documents 90 connected by a plurality of edges 92. As can be seen, documents 90 separate into identifiable subgroups of related documents that provide a mapping of the content of documents 90. For example, the layout of documents 90 in subgroup 94 show areas that are relatively dense and areas that are relatively sparse with respect to the number of documents having content related to that area.

Although the present invention has been described in detail, it should be understood that various changes, substitutions and alterations can be made hereto without departing from the spirit and scope of the invention as defined by the appended claims.

What is claimed is:

1. An automated process, using a computer, for mapping a relationship of content of a collection of documents, comprising:

providing a collection of documents, each document including content;

determining relevance measures, each relevance measure representing a relevance between a pair of documents, each relevance measure comprising a log likelihood ratio relevance measure, and each relevance measure based upon a comparison of the content of the pair of documents; and generating a content graph having nodes and edges, each edge connecting two nodes, the content graph having a node associated with each document and having an edge connecting nodes for which the relevance measure between associated documents is greater than a specified threshold;

such that the content graph maps the relationship of the content of the collection of documents.

2. The process of claim 1, wherein generating the content graph comprises:

creating a node associated with each document;

selecting a pair of nodes to process;

determining whether the relevance measure between the selected pair of nodes is greater than a specified threshold;

if so, connecting the selected pair of nodes with an edge and associating the relevance measure with the edge; and repeating selecting, determining and connecting until there are no unprocessed pairs of nodes.

3. The process of claim 2, wherein generating a content graph further includes generating a directed graph by determining a direction of the edge between each selected pair of nodes based upon specified criteria.

4. The process of claim 1, wherein each document includes text that describes the content and each relevance measure is based upon a comparison of the text of each pair of documents.

5. The process of claim 1, further comprising generating a layout based upon the content graph to provide a visual display of the relationship between the documents.

6. The process of claim 5, wherein generating a layout comprises generating a time-based layout.

7. The process of claim 5, wherein generating a layout comprises generating a gravity layout.

8. The process of claim 5, wherein generating a layout comprises generating a minimum-energy layout.

9. An automated system for mapping a relationship of content of a collection of documents, comprising:

a data storage device storing relevance measures, each relevance measure representing a relevance between a pair of documents in a collection of documents, each relevance measure comprising a log likelihood ratio relevance measure, and each relevance measure based upon a comparison of the content of the pair of documents;

a memory device operable to store a software program; and a processor coupled to the data storage device and the memory device, the processor operable to execute the software program to;

generate a content graph having nodes and edges, each edge connecting two nodes, the content graph having a node associated with each document and having an edge connecting nodes for which the relevance measure between associated documents is greater than a specified threshold;

such that the content graph maps the relationship of the content of the collection of documents.

10. The system of claim 9, wherein generating the content graph comprises:

creating a node associated with each document;

selecting a pair of nodes to process;

determining whether the relevance measure between the selected pair of nodes is greater than a specified threshold;

if so, connecting the selected pair of nodes with an edge and associating the relevance measure with the edge; and repeating selecting, determining and connecting until there are no unprocessed pairs of nodes.

11. The system of claim 10, wherein the content graph is a directed content graph generated by determining a direction of the edge between each selected pair of nodes based upon specified criteria.

12. The system of claim 9, wherein each document includes text that describes the content and each relevance measure is based upon a comparison of the text of each pair of documents.

13. The system of claim 9, wherein the processor is further operable to execute the software program to generate a layout based upon the content graph to provide a visual display of the relationship between the documents.

14. The system of claim 13, wherein the layout comprises a time-based layout.

15. The system of claim 13, wherein the layout comprises a gravity layout.

16. The system of claim 13, wherein the layout comprises a minimum-energy layout.

17. An automated system for mapping a relationship of content of a collection of documents, comprising:

a collection of documents, each document including content;

a relevance generator connected to access the collection of documents, the relevance generator operable to generate relevance measures, each relevance measure representing a relevance between a pair of documents, each relevance measure comprising a log likelihood ratio relevance measure, and each relevance measure based upon a comparison of the content of the pair of documents;

a graph generator connected to access the relevance measures, the graph generator operable to generate a content graph having nodes and edges where each edge connects two nodes, the content graph having a node associated with each document and having an edge connecting nodes for which the relevance measure between associated documents is greater than a specified threshold; and a layout generator connected to access the content graph, the layout generator operable to generate a layout based upon the content graph to provide a visual display of the relationship between the documents.

18. The system of claim 17, wherein each document includes text that describes the content and each relevance measure is based upon a comparison of the text of each pair of documents.

19. The system of claim 17, wherein graph generator generates the content graph by:

creating a node associated with each document;

selecting a pair of nodes to process;

determining whether the relevance measure between the selected pair of nodes is greater than a specified threshold;

if so, connecting the selected pair of nodes with an edge and associating the relevance measure with the edge; and repeating selecting, determining and connecting until there are no unprocessed pairs of nodes.

20. The system of claim 19, wherein the content graph is a directed content graph generated by determining a direction of the edge between each selected pair of nodes based upon specified criteria.

* * * * *